Sept. 12, 1939.  A. E. ANDERSON  2,172,950
AUTOMATIC SWITCHING EQUIPMENT
Filed March 22, 1939
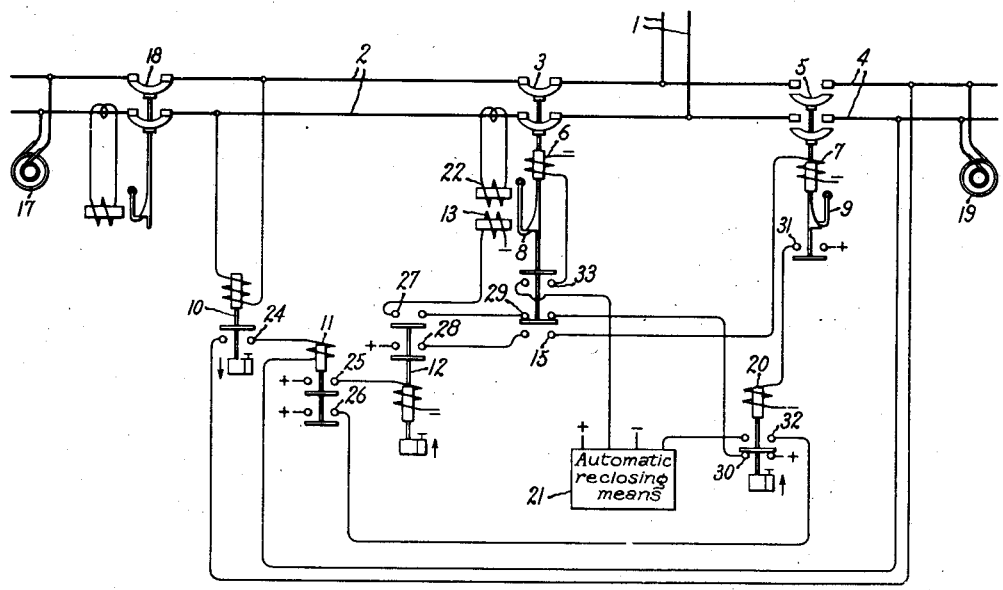
Inventor:
Arvid E. Anderson,
by Harry E. Dunham
His Attorney.

Patented Sept. 12, 1939

2,172,950

UNITED STATES PATENT OFFICE 2,172,950

AUTOMATIC SWITCHING EQUIPMENT

Arvid E. Anderson, Drexel Hill, Pa., assignor to General Electric Company, a corporation of New York Application March 22, 1939, Serial No. 263,384

7 Claims. (Cl. 171—97)

My invention relates to automatic switching equipments and particularly to equipments for controlling the connections between a load circuit, a preferred supply circuit and an emergency supply circuit therefor so that, when the preferred supply circuit fails, the load circuit is transferred to the emergency circuit until the preferred circuit is restored to normal when the load circuit is transferred back to the preferred circuit. In some instances it is desirable to reenergize the preferred circuit from the emergency circuit while the load circuit remains connected to the emergency supply circuit in case the preferred circuit is not restored to normal within a predetemined time after it fails, and one object of my invention is to provide an arrangement of apparatus for accomplishing this result.

In accordance with the preferred embodiment of my invention, I provide an arrangement for effecting a predetermined number of reclosures of the circuit breaker between the preferred supply circuit and the load circuit in case the voltage of the preferred supply circuit is not restored to a predetermined value within a predetermined time after it fails.

My invention will be better understood from the following description when taken in connection with the accompanying drawing the single figure of which diagrammatically illustrates an automatic switching arrangement embodying my invention for controlling the connection between a load circuit and a preferred and an emergency supply circuit therefor, and its scope will be pointed out in the appended claims.

In the accompanying drawing 1 represents a load circuit which is arranged to be connected to a preferred supply circuit 2 by means of a switch 3 and to an emergency supply circuit 4 by means of a switch 5. The switches 3 and 5 may be of any suitable type, examples of which are well-known in the art. As shown in the drawing, switches 3 and 5 are latched-closed breakers having closing coils 6 and 7, respectively, and latches 8 and 9, respectively, for holding the circuit breakers in their closed positions.

In order to simplify the disclosure, I have shown the load circuit 1 and the supply circuits 2 and 4 as single phase circuits, but it will be apparent to those skilled in the art that my invention is applicable to circuits of any number of phases.

Normally the switch 3 is closed and the switch 5 is open so that the load circuit 1 is supplied with current from the preferred supply circuit 2. In order to effect the disconnection of the preferred supply circuit 2 from the load circuit 1 and the subsequent connection of the emergency supply circuit 4 to the load circuit 1 when the preferred circuit 2 fails and the voltage thereof remains below a predetermined value for a predetermined time, I provide a voltage relay 10 which is so connected that it responds to the voltage of the supply circuit 2. The relay 10 in turn controls the connection between a second voltage relay 11 and the emergency supply circuit 4 so that the relay 11 responds to the voltage of the supply circuit 4 after the voltage of the supply circuit 2 has remained below a predetermined value for a predetermined time. Relay 11, when energized, completes an energizing circuit for a time relay 12 which, after being energized for a predetermined time, completes an energizing circuit for a trip coil 13 associated with the circuit breaker 3 so as to effect the opening of the circuit breaker 3 to disconnect the supply circuit 2 from the load circuit 1. By closing its auxiliary contacts 15 when it opens, the circuit breaker 3 completes an energizing circuit for the closing coil 7 of the circuit breaker 5 so that the circuit breaker 5 closes and connects the emergency supply circuit 4 to the load circuit 1.

In certain systems where, for example, the source 17, supplying the preferred supply circuit 2, is connected thereto by a manually reclosed overload circuit breaker 18 at a point remote from the circuit breaker 3 and the source of current respectively supplying the circuits 2 and 4 are not in synchronism, it may be desirable to reenergize the supply circuit 2 from the emergency supply circuit 4 in response to the closing of the circuit breaker 5 so that the circuit breaker 18 may be reclosed by the operator at the remote point when the source 17 is in synchronism with the source 19 which supplies current to the emergency supply circuit 4.

For effecting the reclosure of the circuit breaker 3 in response to the closure of the circuit breaker 5, I provide a time relay 20 which is energized in response to the closure of the circuit breaker 5. The time relay 20, after being in operation for a predetermined time, initiates the operation of suitable automatic reclosing means 21 to complete an energizing circuit for the closing coil 6 of the circuit breaker 3 a predetermined number of times with predetermined time intervals between successive energizations of the closing coil 6. Since automatic reclosing means of this type are well-known in the art and the detailed circuits thereof form no part of my present invention, I have represented such automatic reclosing means in the drawing by a rectangle. Anderson et al. Patent 1,968,629, granted July 31, 1934, and assigned to the assignee of this application, discloses the details of an automatic reclosing arrangement which may be used as the automatic reclosing means 21 to effect the first energization of the closing coil 6 substantially instantaneously after the timing relay 20 has completed its timing operation and for effecting a predetermined number of successive energizations of the closing coil 6 with relatively long predetermined time intervals between successive energizations if the circuit breaker 3 fails to remain closed after each reclosure thereof.

For effecting the opening of the circuit breaker 3 when an excessive amount of current flows through the circuit breaker, I provide means responsive to abnormal conditions occurring on supply circuit 2 such as an overload trip coil 22 which is connected to the supply circuit 2 in such a manner that it responds to the amount of current flowing therein. When sufficiently energized, the overload trip coil 22 releases the latch 8 of the circuit breaker 3 so as to effect the opening of the circuit breaker.

The operation of the embodiment of my invention shown in the drawing is as follows:

Normally the circuit breaker 3 is closed and the circuit breaker 5 is opened so that the preferred supply circuit 2 supplies current to the load circuit 1 and the various control devices are in the positions shown in the drawing. When the voltage of the preferred supply circuit 2 decreases below a predetermined value for any reason and remains below this predetermined value for a predetermined time, the voltage relay 10 closes its contacts 24 and connects the winding of the voltage relay 11 across the emergency supply circuit 4 so that, if the voltage of this supply circuit is above a predetermined value, relay 11 closes its contacts 25 and 26. The closing of the contacts 25 of the relay 11 completes an energizing circuit for the time relay 12 which, after being energized for a predetermined time, closes its contacts 27 and 28. The closing of the contacts 27 completes through the auxiliary contacts 29 of the circuit breaker 3 and the contacts 30 of the relay 20 an energizing circuit for the trip coil 13 of the circuit breaker 3. The energization of the trip coil 13 releases the latch 8 so that the circuit breaker 3 opens and disconnects the preferred supply circuit 2 from the load circuit 1. By closing its auxiliary contacts 15, the circuit breaker 3 completes through the contacts 28 of the time relay 12 an energizing circuit for the closing coil 7 of the circuit breaker 5 so that the circuit breaker 5 closes and connects the emergency supply circuit 4 to the load circuit 1. By closing its auxiliary contacts 31, the circuit breaker 5 completes an energizing circuit for the time relay 20 which, after being energized for a predetermined time, opens its contacts 30 and closes its contacts 32. The opening of the contacts 30 interrupts the circuit of the trip coil 13 so that the circuit breaker 3 cannot be opened in response to the voltage of the preferred supply circuit 2 remaining below a predetermined value for a predetermined time. The closing of the contacts 32 of the relay 20 completes through the contacts 26 of the voltage relay 11 the starting circuit of the automatic reclosing means 21 which then functions in a manner well-known in the art to complete through the auxiliary contacts 33 of the circuit breaker 3 an energizing circuit for the closing coil 6 to reclose the circuit breaker 3 and to effect a predetermined number of subsequent reclosures of the circuit breaker 3 at predetermined time intervals between successive reclosures in case the overcurrent trip coil 22 effects the opening of the circuit breaker 3 after each reclosure thereof.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, a load circuit, a preferred supply circuit connected to said load circuit, an emergency supply circuit normally disconnected from said load circuit, means responsive to a predetermined abnormal electric condition of said preferred supply circuit for disconnecting said preferred supply circuit from said load circuit and for connecting said emergency supply circuit to said load circuit, and means dependent upon the existence of said predetermined abnormal electric condition of said preferred supply circuit for a predetermined time after said emergency supply circuit is connected to said load circuit for reconnecting said preferred supply circuit to said load circuit.

2. In combination, a load circuit, a preferred supply circuit connected to said load circuit, an emergency supply circuit normally disconnected from said load circuit, means responsive to a predetermined subnormal voltage condition of said preferred supply circuit for disconnecting said preferred supply circuit from said load circuit and for connecting said emergency supply circuit to said load circuit, and means dependent upon the existence of said predetermined subnormal voltage condition of said preferred supply circuit for a predetermined time after said emergency supply circuit is connected to said load circuit for reconnecting said preferred supply circuit to said load circuit.

3. In combination, a load circuit, a preferred supply circuit connected to said load circuit, an emergency supply circuit normally disconnected from said load circuit, means responsive to a predetermined subnormal voltage of said preferred supply circuit existing for a predetermined time while the voltage of said emergency supply circuit is above a predetermined value for disconnecting said preferred supply circuit from said load circuit and for connecting said emergency supply circuit to said load circuit, and means dependent upon the existence of said predetermined subnormal voltage of said preferred supply circuit for a predetermined time after said emergency supply circuit is connected to said load circuit for reconnecting said preferred supply circuit to said load circuit.

4. In combination, a load circuit, a preferred supply circuit, a switch connecting said circuits, an emergency supply circuit, a second switch for connecting said emergency supply circuit to said load circuit, means responsive to the voltage of said preferred supply circuit remaining below a predetermined value for a predetermined time for effecting the opening of said first mentioned switch and the closing of said second switch, means responsive to a predetermined abnormal current condition through said first mentioned switch for effecting the opening thereof, automatic reclosing means for said first mentioned switch, and means responsive to the closure of said second switch for initiating the operation of said automatic reclosing means.

5. In combination, a load circuit, a preferred supply circuit, a switch connecting said circuits, an emergency supply circuit, a second switch for connecting said emergency supply circuit to said load circuit, means responsive to the voltage of said preferred supply circuit remaining below a predetermined value for a predetermined time for effecting the opening of said first mentioned switch and the closing of said second switch, means responsive to a predetermined overcurrent through said first mentioned switch for effecting the opening thereof, automatic reclosing means for said first mentioned switch, and timing means responsive to the closure of said second switch for initiating the operation of said automatic reclosing means and for rendering said voltage responsive means inoperative to open said first mentioned switch.

6. In combination, a load circuit, a preferred supply circuit connected to said load circuit, an emergency supply circuit normally disconnected from said load circuit, means responsive to a predetermined subnormal voltage of said preferred supply circuit existing for a predetermined time for disconnecting said preferred supply circuit from said load circuit and for connecting said energizing supply circuit to said load circuit, means responsive to a predetermined abnormal current condition in said preferred supply circuit for disconnecting said preferred supply circuit from said load circuit, automatic reclosing means for reconnecting said preferred supply circuit to said load circuit, and means for initiating the operation of said automatic reclosing means a predetermined time after said emergency supply circuit is connected to said load circuit.

7. In combination, a load circuit, a preferred supply circuit connected to said load circuit, an emergency supply circuit normally disconnected from said load circuit, means responsive to a predetermined subnormal voltage of said preferred supply circuit existing for a predetermined time for disconnecting said preferred supply circuit from said load circuit and for connecting said emergency supply circuit to said load circuit, means responsive to a predetermined abnormal current condition in said preferred supply circuit for disconnecting said preferred supply circuit from said load circuit, automatic reclosing means for reconnecting said preferred supply circuit to said load circuit, and means for initiating the operation of said automatic reclosing means a predetermined time after said emergency supply circuit is connected to said load circuit and for rendering said subnormal voltage responsive means inoperative to disconnect said preferred supply circuit from said load circuit.

ARVID E. ANDERSON.